(12) United States Patent
Line et al.

(10) Patent No.: US 10,737,600 B1
(45) Date of Patent: Aug. 11, 2020

(54) EPP SEAT BACK CARRIER

(71) Applicant: Ford Global Technologies, LLC, Dearborn, MI (US)

(72) Inventors: Johnathan Andrew Line, Northville, MI (US); Spencer Robert Hoernke, Dundas (CA); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 16/265,465

(22) Filed: Feb. 1, 2019

(51) Int. Cl.
| | |
|---|---|
| *B60N 2/427* | (2006.01) |
| *B60N 2/68* | (2006.01) |
| *B60N 2/72* | (2006.01) |
| *B60N 2/66* | (2006.01) |

(52) U.S. Cl.
CPC ............... *B60N 2/68* (2013.01); *B60N 2/66* (2013.01); *B60N 2/72* (2013.01)

(58) Field of Classification Search
CPC ........ B60N 2/68; B60N 2/7094; B60N 2/682; B60N 2/686; B60N 2/64; B60N 2/42745; B60R 21/207
See application file for complete search history.

(56) References Cited

U.S. PATENT DOCUMENTS

| | | | | |
|---|---|---|---|---|
| 4,205,879 A | * | 6/1980 | Heling ................... | B60N 2/753 297/411.32 |
| 7,841,662 B2 | * | 11/2010 | Samain ................ | B60N 2/0232 297/284.4 |
| 7,926,872 B2 | * | 4/2011 | Chida .................. | B60N 2/4228 297/216.13 |
| 8,690,255 B2 | * | 4/2014 | Yamaki ................ | B60N 2/4228 297/216.14 |
| 9,566,930 B2 | * | 2/2017 | Line ..................... | B60R 21/2165 |
| 9,610,871 B2 | * | 4/2017 | Yasuda .............. | B60N 2/42745 |
| 10,286,818 B2 | * | 5/2019 | Line ......................... | B60N 2/62 |
| 10,604,041 B2 | * | 3/2020 | Johnston .................. | B60N 2/70 |
| 2003/0071501 A1 | * | 4/2003 | Cruz Fernandes de Pinho .......... | B60N 2/6671 297/284.4 |
| 2003/0085600 A1 | * | 5/2003 | Mori ...................... | B60N 2/667 297/284.4 |
| 2004/0140705 A1 | * | 7/2004 | McMillen ................ | B60N 2/76 297/378.1 |
| 2005/0040686 A1 | * | 2/2005 | Van-Thournout .... | B60N 2/4228 297/284.4 |

(Continued)

FOREIGN PATENT DOCUMENTS

| | | |
|---|---|---|
| DE | 102005020335 A1 | 8/2006 |
| WO | 2016120080 A1 | 8/2016 |

*Primary Examiner* — Shin H Kim
(74) *Attorney, Agent, or Firm* — David Coppiellie; Price Heneveld LLP

(57) ABSTRACT

A seating assembly includes a seat and a seatback pivotally coupled with the seat. The seatback includes a seatback carrier formed from expanded polypropylene. The seatback carrier includes first and second side walls and an upper wall that together define a lower opening. A metallic support member is molded within the seatback carrier. The metallic support member includes an upper portion extending below the upper wall between the first and second side walls. The metallic support member also includes a lower portion extending across the lower opening. A cushion assembly is disposed on the seatback carrier.

20 Claims, 11 Drawing Sheets

(56) References Cited

U.S. PATENT DOCUMENTS

| | | | |
|---|---|---|---|
| 2008/0136240 A1* | 6/2008 | Matthews | B60N 2/4235 297/354.1 |
| 2009/0108646 A1* | 4/2009 | Chida | B60N 2/4228 297/216.13 |
| 2009/0152929 A1* | 6/2009 | Sung | B60N 2/68 297/452.18 |
| 2013/0069415 A1* | 3/2013 | Yasuda | B60N 2/682 297/452.18 |
| 2014/0232158 A1* | 8/2014 | Sano | B60N 2/68 297/354.1 |
| 2015/0231997 A1* | 8/2015 | Itoi | B60N 2/682 297/391 |
| 2015/0246627 A1* | 9/2015 | Shimizu | B60N 2/68 297/216.14 |
| 2015/0367762 A1* | 12/2015 | Yasuda | B60N 2/42745 297/216.14 |
| 2016/0009210 A1* | 1/2016 | Sasaki | B60N 2/5657 297/180.13 |
| 2016/0096450 A1* | 4/2016 | Kondrad | B60N 2/682 297/285 |
| 2016/0176327 A1* | 6/2016 | Tippl | B60N 2/20 297/216.12 |
| 2016/0229319 A1* | 8/2016 | Fujita | B60N 2/4256 |
| 2017/0341551 A1 | 11/2017 | Benthaus et al. | |
| 2018/0154812 A1* | 6/2018 | McMillen | B60N 2/02 |
| 2018/0201169 A1* | 7/2018 | Hashimoto | B21D 47/04 |
| 2018/0272906 A1* | 9/2018 | Onuma | B60N 2/68 |
| 2019/0337432 A1* | 11/2019 | Smith | B60N 2/682 |

\* cited by examiner

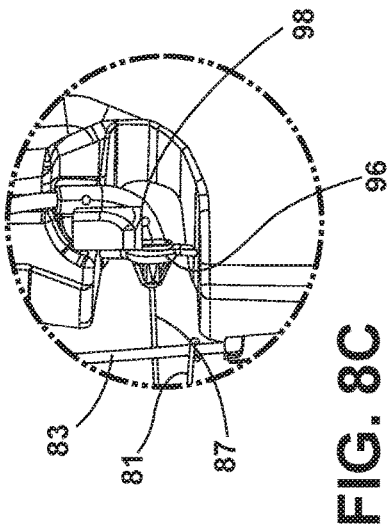
FIG. 8A
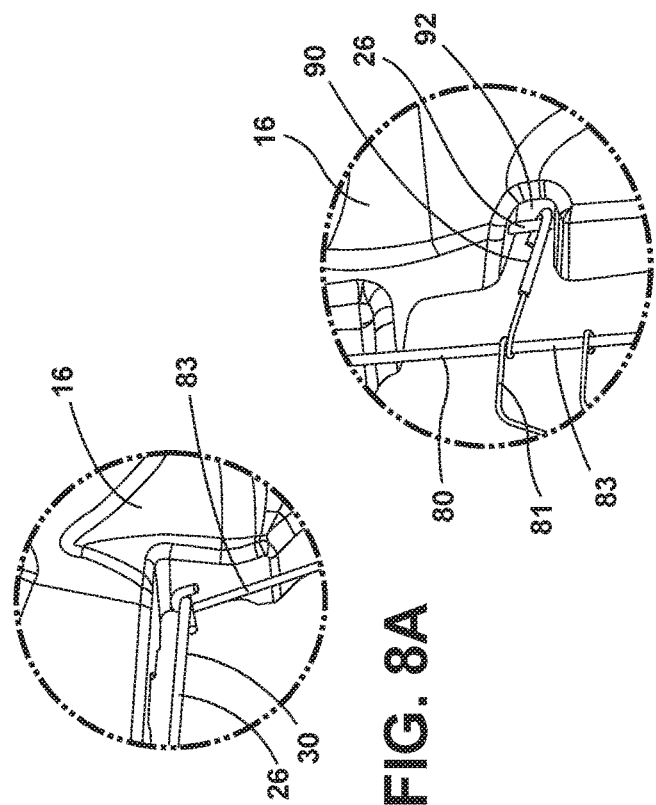
FIG. 8B
FIG. 8C
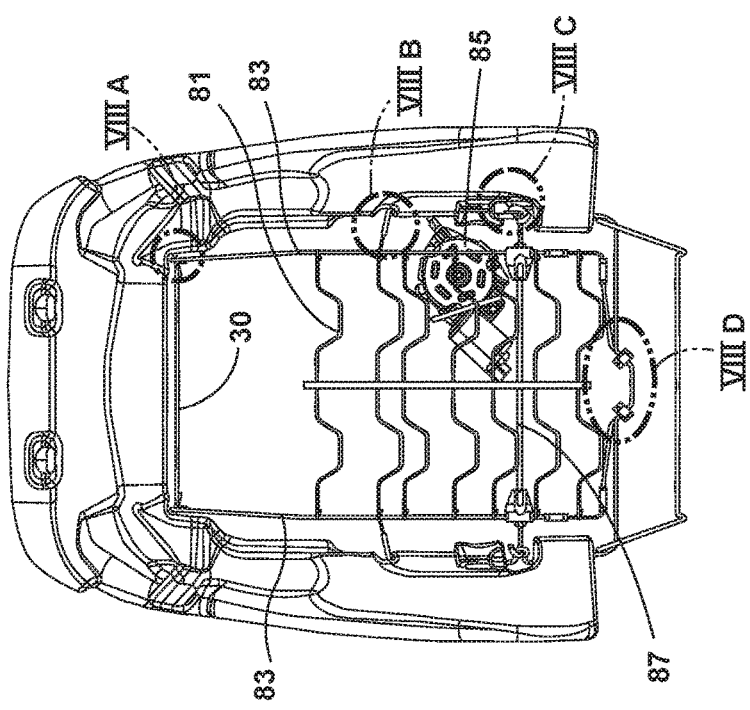
FIG. 8
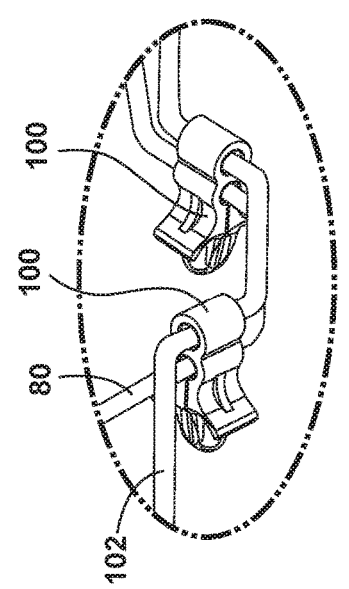
FIG. 8D

EPP SEAT BACK CARRIER

FIELD OF THE DISCLOSURE

The present disclosure generally relates to a seatback carrier for use in a vehicle, and more specifically, to a seatback carrier constructed from a lightweight material ad which includes a versatile configuration that provides improved fuel efficiency to the vehicle and comfort to the passenger.

BACKGROUND OF THE DISCLOSURE

Lightweight seating assembly solutions for vehicles that also provide comfortability of occupants is increasing in importance as the desire for improved fuel efficiency increases.

SUMMARY OF THE DISCLOSURE

According to one aspect of the present disclosure, a seating assembly includes a seat and a seatback pivotally coupled with the seat. The seatback includes a seatback carrier formed from expanded polypropylene (EPP). The seatback carrier includes first and second side walls and an upper wall that together define a lower opening. A metallic support member is molded within the seatback carrier. The metallic support member includes an upper portion extending below the upper wall between the first and second side walls. The metallic support member also includes a lower portion extending across the lower opening. A cushion assembly is disposed on the seatback carrier.

Embodiments of the first aspect of the disclosure can include any one or a combination of the following features:
- a trim wire operably coupled with the lower portion of the metallic support member;
- a trim stock operably coupled with the trim wire;
- wherein the trim stock includes a retainer configured to engage the trim wire;
- wherein the metallic support member is an elongate looped wire;
- a lumbar basket operably coupled with the seatback carrier;
- wherein the lumbar basket is engaged with the metallic support member; and
- mechanical fasteners configured to snap-fittingly engage the cushion assembly with a frame of the seating assembly.

According to another aspect of the present disclosure, a seating assembly includes a seatback. The seatback includes a seatback carrier. The seatback carrier includes first and second side walls and an upper wall that together define a lower opening. A support member is molded within the seatback carrier. The support member includes an upper portion extending below the upper wall and a lower portion extending across the lower opening. A cushion assembly is disposed on the seatback carrier.

Embodiments of the second aspect of the disclosure can include any one or a combination of the following features:
- a lumbar basket operably coupled with the seatback carrier;
- wherein the lumbar basket is engaged with the support member;
- mechanical fasteners configured to snap-fittingly engage the cushion assembly with a frame of said seating assembly; and
- a trim wire operably coupled with the lower portion of the support member.

According to yet another aspect of the present disclosure, a seating assembly includes a seatback. The seatback includes a seatback carrier formed from a polymeric material. The seatback carrier includes first and second side walls and an upper wall that together define an opening. An elongate support member is molded within the seatback carrier. The elongate support member includes an upper portion extending below the upper wall and a lower portion extending across the opening. A cushion assembly is disposed on the seatback carrier.

Embodiments of the third aspect of the disclosure can include any one or a combination of the following features:
- wherein the elongate support member is an elongate looped wire integrally molded into the first and second side walls of the seatback carrier;
- wherein the elongate support member includes retention features that protract from each of the first and second side walls of the seatback carrier;
- a trim wire operably coupled with the lower portion of the elongate support member;
- wherein the cushion assembly includes a J-hook that protrudes from a lower portion thereof and engages the trim wire;
- a lumbar basket operably coupled with the seatback carrier; and
- mechanical fasteners configured to snap-fittingly engage the cushion assembly with a frame of said seating assembly.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 8 is a front elevational view of a seatback carrier;

FIG. 8A is an enlarged front elevational view of area VIIIA of FIG. 8;

FIG. 8B is an enlarged front elevational view of area VIIIB of FIG. 8;

FIG. 8C is an enlarged front elevational view of area VIIIC of FIG. 8;

FIG. 8D is an enlarged front elevational view of area VIIID of FIG. 8;

DETAILED DESCRIPTION

Figure 1:
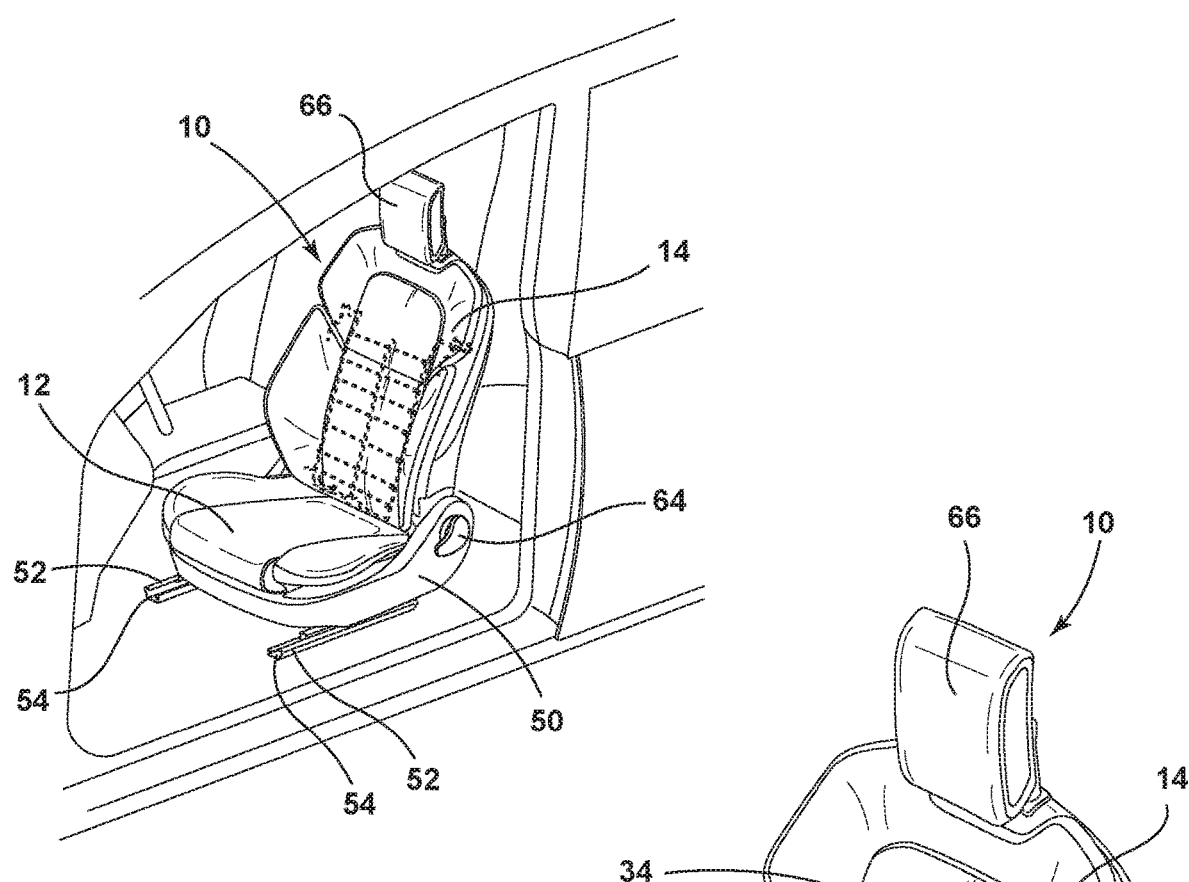
FIG. 1 is a top perspective view of a seating assembly of the present disclosure positioned within a vehicle.
Figure 2:
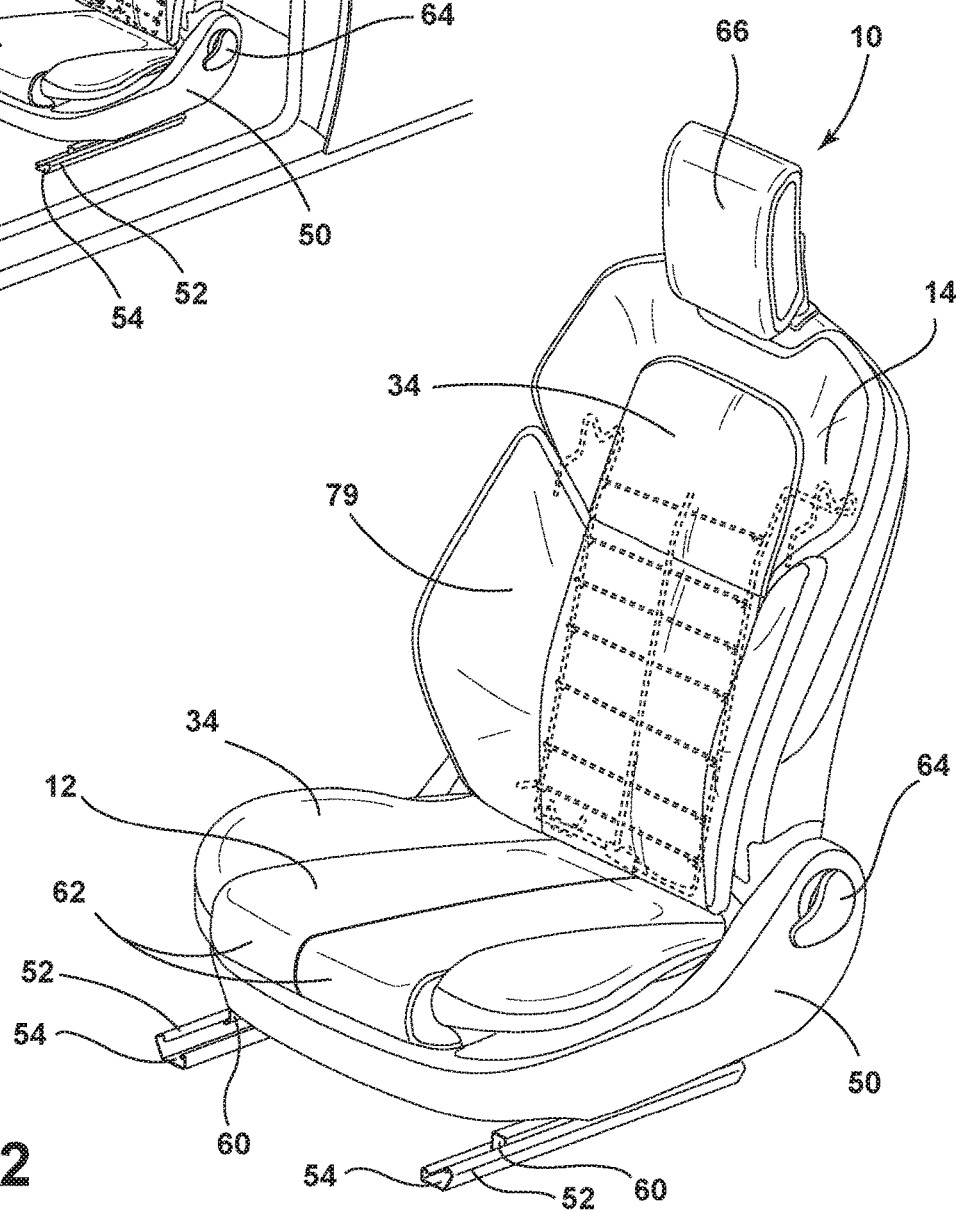
FIG. 2 is a top perspective of view of a seating assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-13B, reference number 10 generally designates a seating assembly including a seat 12 and a seatback 14 pivotally coupled with the seat 12. The seatback 14 includes a seatback carrier 16 formed from a polymeric material such as expanded polypropylene. The seatback carrier 16 includes first and second side walls 18, 20 and an upper wall 22 that together define a lower opening 24. A metallic support member 26 is molded within the seatback carrier 16. The metallic support member 26 includes an upper portion 30 extending below the upper wall 22 between the first and second side walls 18, 20. The metallic support member 26 also includes a lower portion 32 extending across the lower opening 24. A cushion assembly 34 is disposed on the seatback carrier 16.

With reference again to FIGS. 1 and 2, the seating assembly 10 may be used in any vehicle, such as a car, a truck, a van, etc. It is also contemplated that the concept set forth in this disclosure may be utilized in a front or forward position of the vehicle as well as a rear or rearward position of the vehicle. The seating assembly 10, as illustrated, includes a seat base 50 that includes a slide assembly 52 having rails 54 configured to support slides 60, and which allows for fore and aft movement of the vehicle seating assembly 10 relative to the vehicle. The seat 12 is operably coupled with the seat base 50 and may include thigh supports 62 that may be independently adjustable. The seatback 14 is pivotally adjustable relative to the seat base 50 and may be adjusted by operation of a manual or motorized control 64. The seatback 14 of the vehicle seating assembly 10 may also include a head restraint 66. Each of the components of the seatback 14 may be configured for adjustability to properly support the weight of various occupants inside the vehicle.

Figure 3:
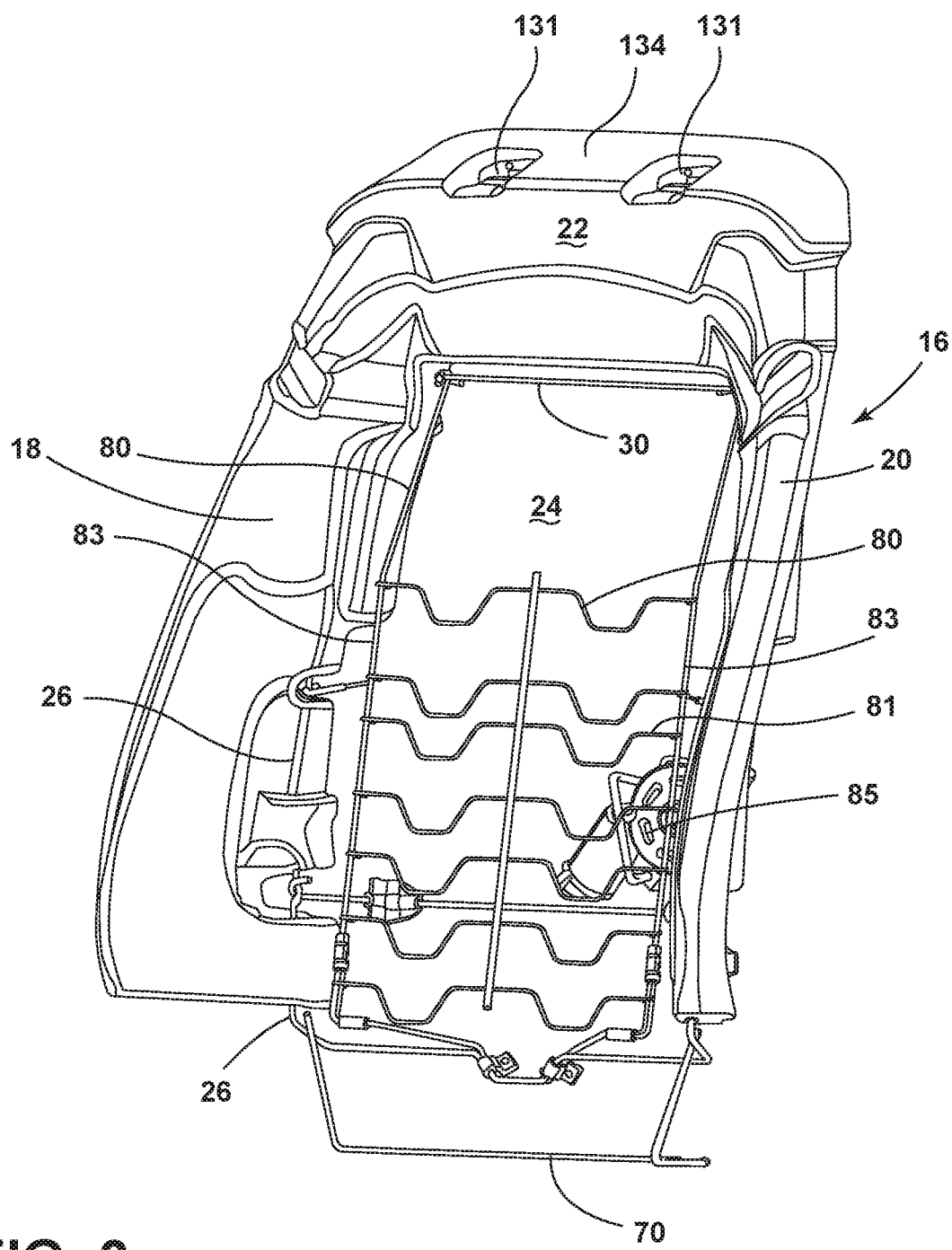
FIG. 3 is a side perspective view of a seatback carrier of the present disclosure.

With reference now to FIG. 3, the illustrated seatback carrier 16 is part of a versatile back module assembly 68 and is constructed from expanded polypropylene, or an expanded polypropylene composite, which provides an assortment of benefits without compromising seatback module functionality. As the complexity of seating assemblies for vehicles has increased, it has become desirable to simplify final assembly production to decrease cost. One solution is to decrease complexity at the final seat assembly stage, thereby creating a seatback module that can carry multiple components include lumbar suspension baskets and wire harnesses. The seatback module, as set forth herein, allows for foam and trim to be installed prior to final assembly, thereby enabling more efficient just-in-time manufacturing. Alternatively, it is also contemplated that incorporation of common seat features, such as wire harnesses and lumbar suspension baskets, into one common module that can be used on multiple programs would also be of value. Yet another solution is to enable sharp A-surface design features by using expanded polypropylene carriers to create sharp edges and distinct features, and to use the polypropylene foam in the insert and in other areas that are needed for passenger comfort. The disclosure set forth herein incorporated all of these solutions.

Figure 4:
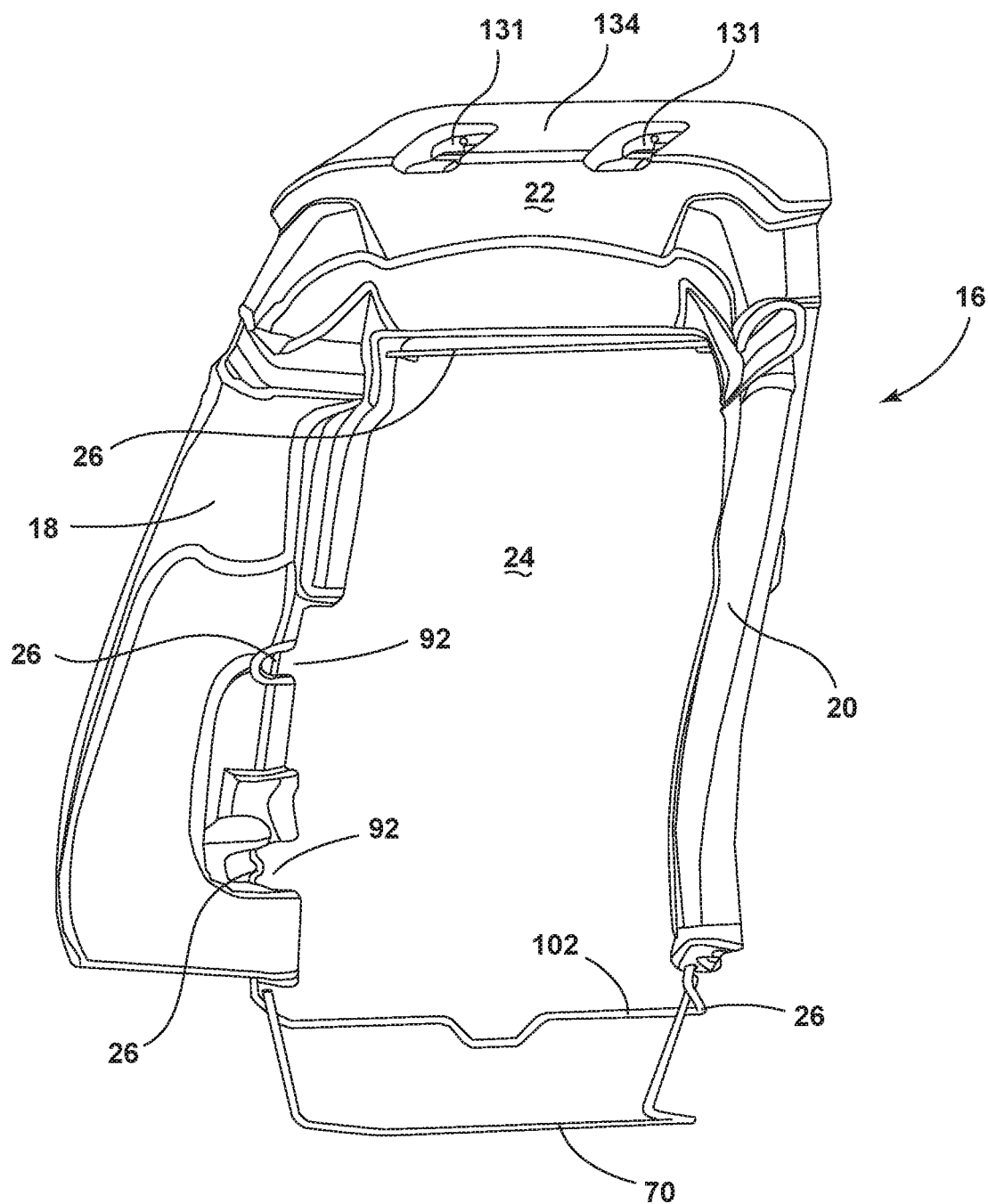
FIG. 4 is a side perspective view of a seatback carrier of the present disclosure with a lumbar basket removed.
Figure 5:
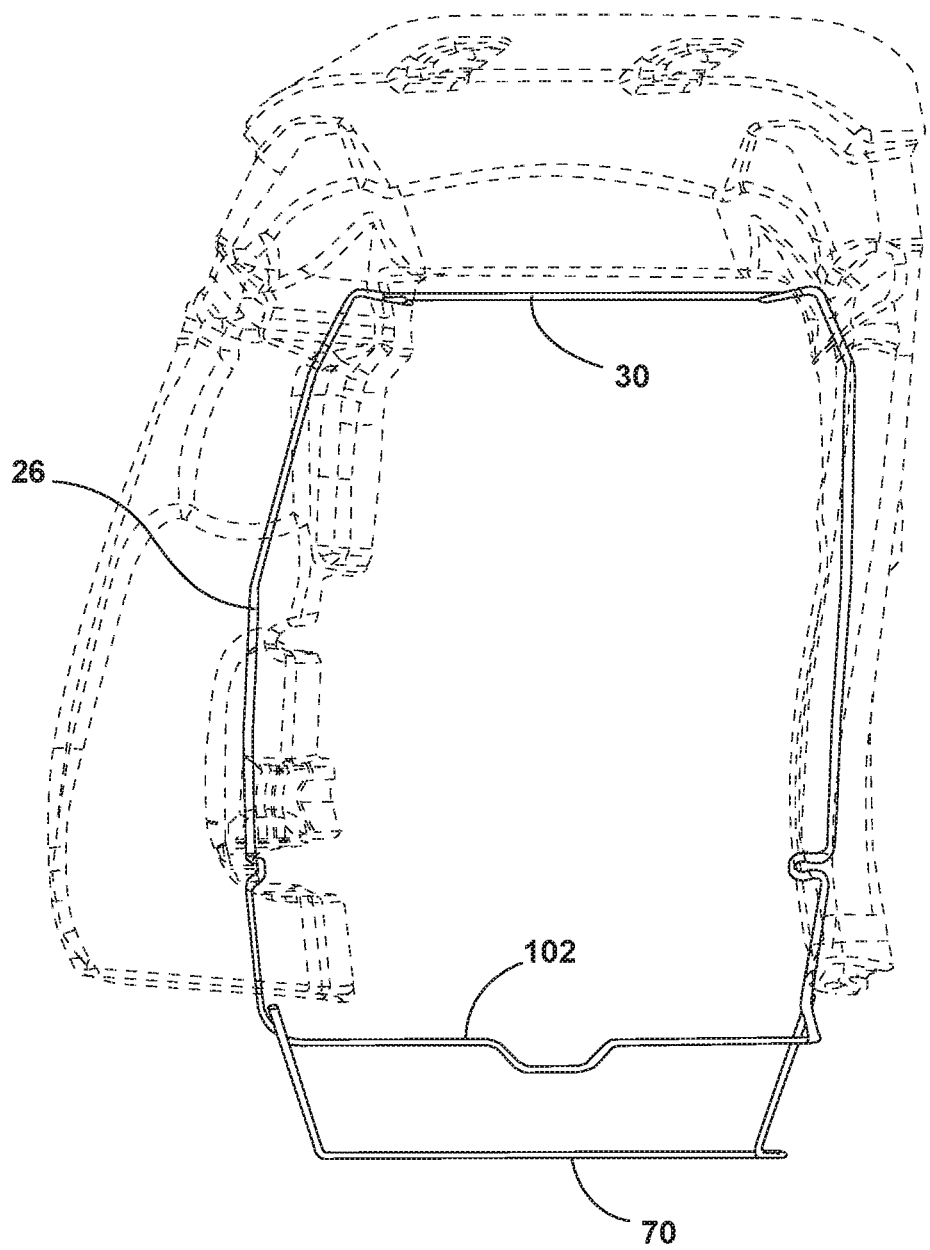
FIG. 5 is a side perspective view of a metallic support member of the present disclosure.

With reference now to FIGS. 4 and 5, the illustrated seatback carrier 16 of the versatile back module assembly 68 includes a variety of nesting features configured to receive the cushion assembly 34. The seatback carrier 16 also includes the metallic support member 26 in the form of a border wire or elongate looped wire. It will be understood that the metallic support member 26 could be replaced by a polymeric loop. The metallic support member 26 includes a lower trim wire 70 that is welded to the metallic support member 26. The lower trim wire 70 is welded onto, or otherwise secured to, the metallic support member 26. The metallic support member 26 is then insert molded to the expanded polypropylene to create the expanded polypropylene seatback carrier 16.

Figure 6:
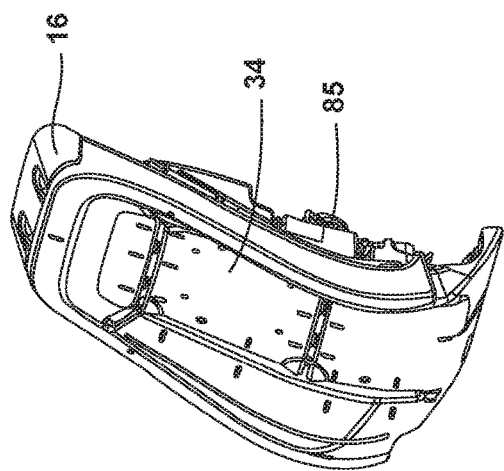
FIG. 6 is a side perspective view of a cushion assembly, a lumbar basket, and a seatback carrier of a seatback operably coupled to one another.
Figure 7B:
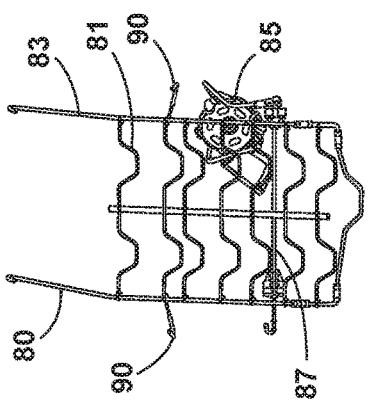
FIG. 7B is a side perspective view of a lumbar basket of a seatback of the present disclosure.
Figure 7C:
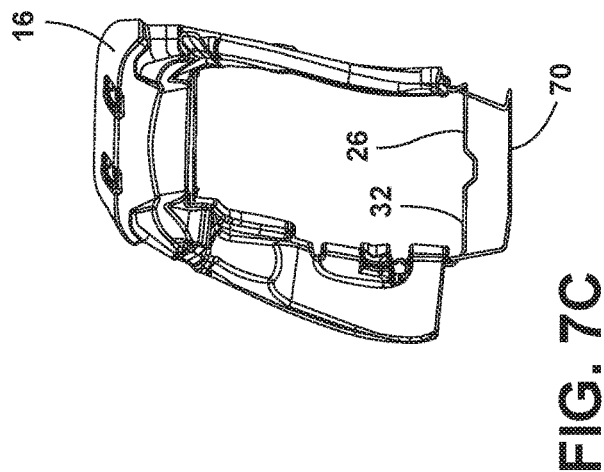
FIG. 7C is a side perspective view of a seatback carrier of a seatback of the present disclosure.
Figure 7A:
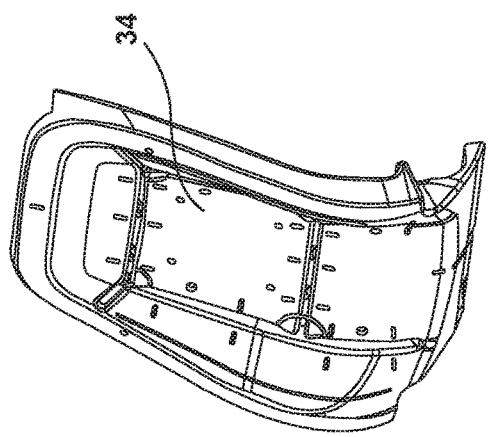
FIG. 7A is a side perspective view of a cushion assembly of a seatback of the present disclosure.
Figure 10C:
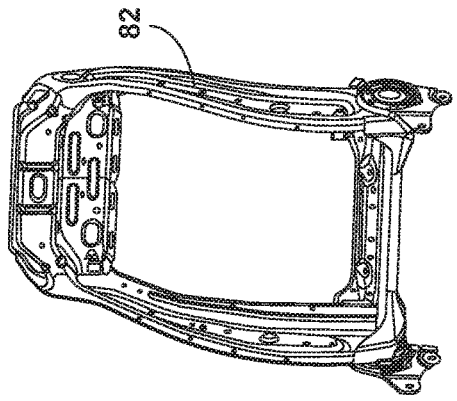
FIG. 10C is a seatback frame configured for receiving the seatback carrier of FIG. 10A and headrest mounting inserts of FIG. 10B.

With reference now to FIGS. 6-7C, the illustrated seatback 14 includes the cushion assembly 34 (FIG. 7A) having a trip stock 79 disposed thereon. The seatback 14 also includes a lumbar suspension, or lumbar basket 80 (FIGS. 3, 7B, and 8), and a seatback frame 82 (FIG. 10C). These components are configured to work in harmony and include coupling features that couple the cushion assembly 34 to the seatback frame and the lumbar basket to the seatback carrier 16. The cushion assembly 34 is contoured to nest against the seatback frame 82. The lumbar basket 80 is configured for engagement with the seatback frame 82, behind the cushion assembly 34. The lumbar basket 80 includes a multitude of cross-seat flexible members 81 coupled to vertical supports 83. A motor 85 may be positioned behind the lumbar basket 80, which may be configured to draw tension down on a lumbar tension wire 87 extending behind the lumbar basket 80.

With reference now to FIGS. 8-8D, the illustrated seating assembly 10 includes a variety of connection features that secure the cushion assembly 34 and lumbar basket 80 to the seatback carrier 16 and seatback frame 82. Specifically, the lumbar basket 80 of the seatback 14 is connected to the metallic support member 26 by hooked members 90 that are operably coupled to the lumbar basket 80. Each of the hooked members 90 engages an opening 92 in the EPP of the seatback carrier 16 where a portion of the metallic support member 26 is exposed. The lumbar tension wire 87 extends behind the lumbar basket 80 and can be drawn forward by activation of the motor 85 to provide additional support to the back of an occupant. The metallic support member 26 is configured to receive a tension wire connector 96 that is secured with a slidable fitting 98 coupled with the seatback carrier 16. The lumbar tension wire 87 may also be drawn down manually by a lever to pull the lumbar basket 80 outward toward a seated occupant to provide support to the lower back of the occupant. The aforementioned connections are shown in each of FIGS. 8A-8C. In addition, modified lower lumbar clips 100 (FIG. 8D) are secured to the lumbar basket 80 and secure the lumbar basket 80 with a lower cross-member 102 of the metallic support member 26.

Figure 9A:
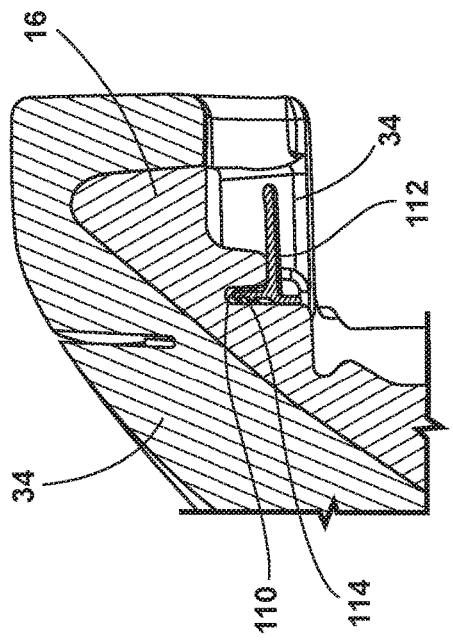
FIG. 9A is a top plan, partial cross-sectional view taken at line IXA-IXA of FIG. 9.
Figure 9B:
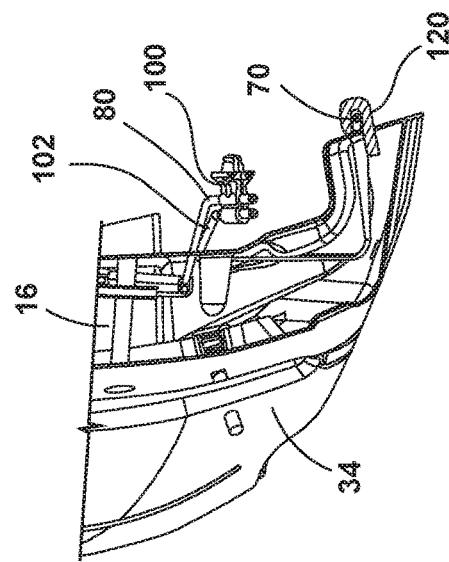
FIG. 9B is a side cross-sectional view taken at line IXB-IXB of FIG. 9.
Figure 9:
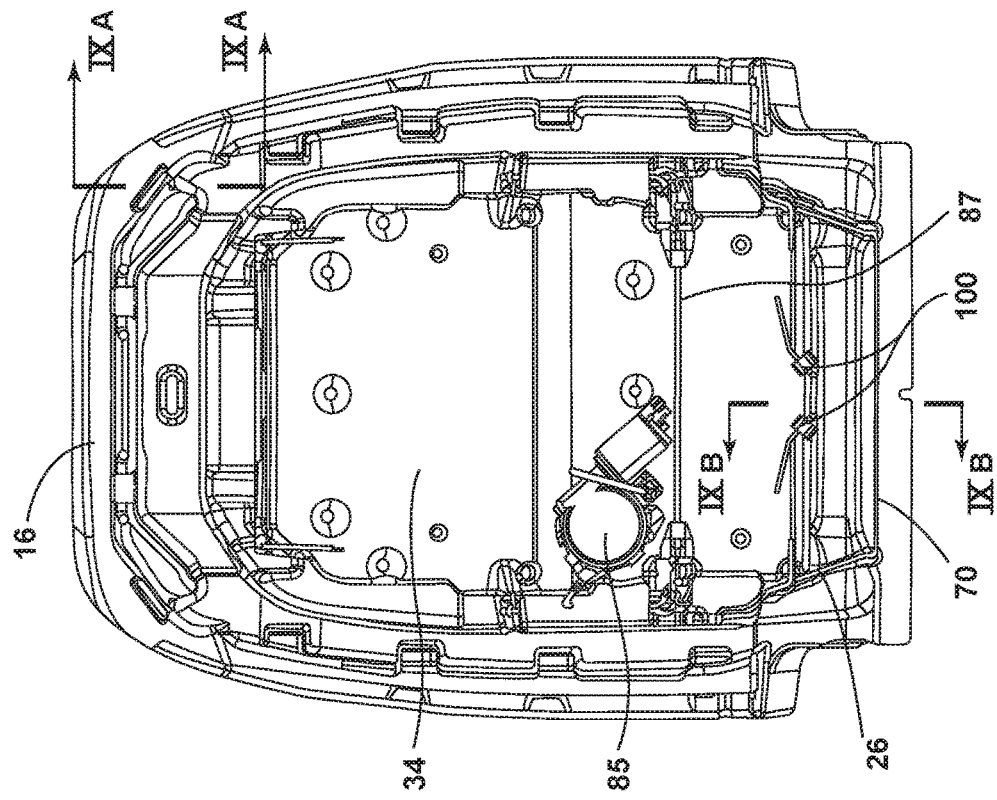
FIG. 9 is a rear elevational view of a seatback carrier and cushion assembly.
Figure 12:
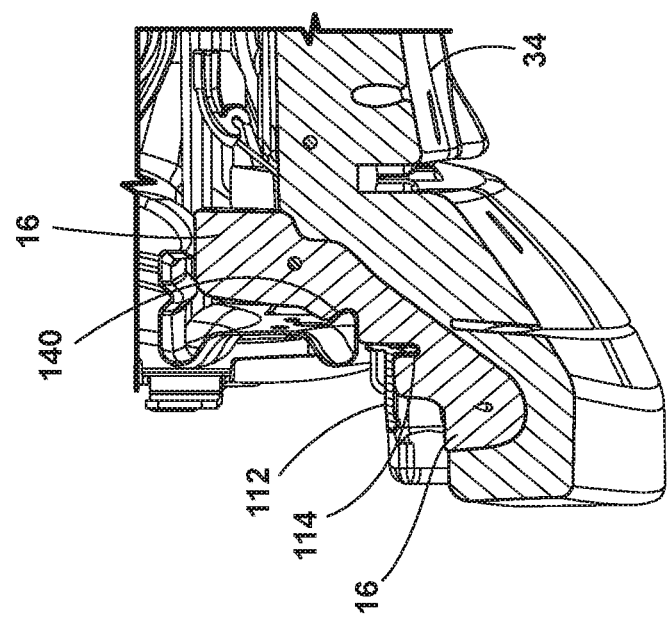
FIG. 12 is a top plan, partial cross-sectional view of a portion of the seatback of FIG. 11.

With reference now to FIGS. 9-9B and 12, the seatback carrier 16 has recesses 110 configured to receive mechanical fasteners 112 operably coupled with the cushion assembly 34. The recesses 110 exist around an outer edge of the seatback carrier 16. Arrow tie downs 114 of the mechanical fasteners 112 are inserted into the seatback carrier 16 to secure the foam and trim around the outer edge of the seatback carrier 16 (FIG. 9A). In addition, the lower trim wire 70 that is welded to the metallic support member 26 is used to secure a lower trim portion of the cushion assembly using a J-hook 120. The J-hook 120 is fixedly coupled to the cushion assembly 34 and projects rearward to capture the lower trim wire 70.

Figure 10:
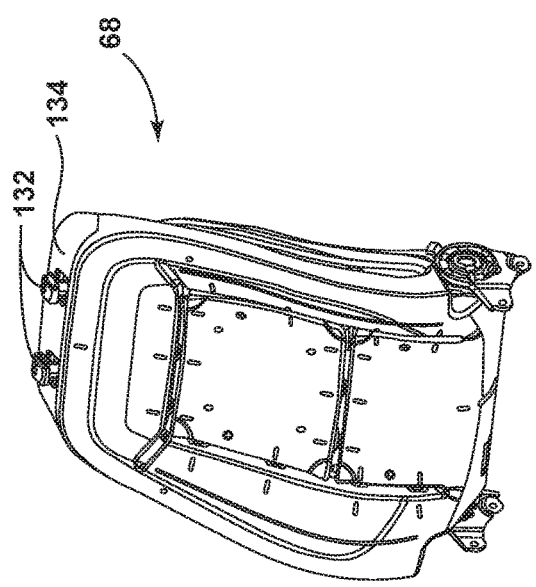
FIG. 10 is a front perspective view of a seatback of the present disclosure.
Figure 10B:
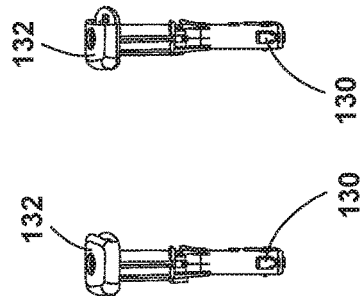
FIG. 10B is a front elevational view of headrest inserts configured for installation within the seatback carrier and seatback frame.
Figure 10A:
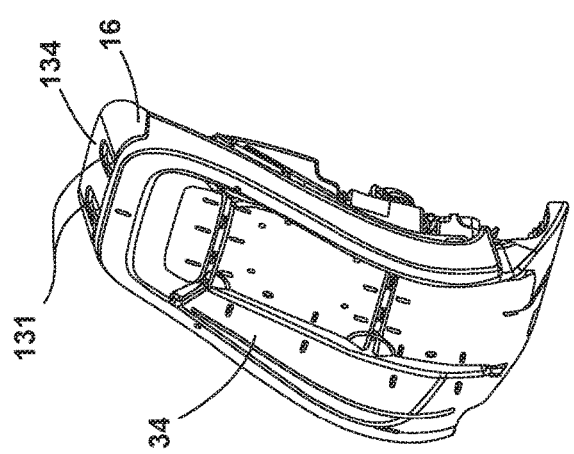
FIG. 10A is a side perspective view of an assembled seatback with headrest inserts removed prior to installation of a seatback frame.
Figure 10D:
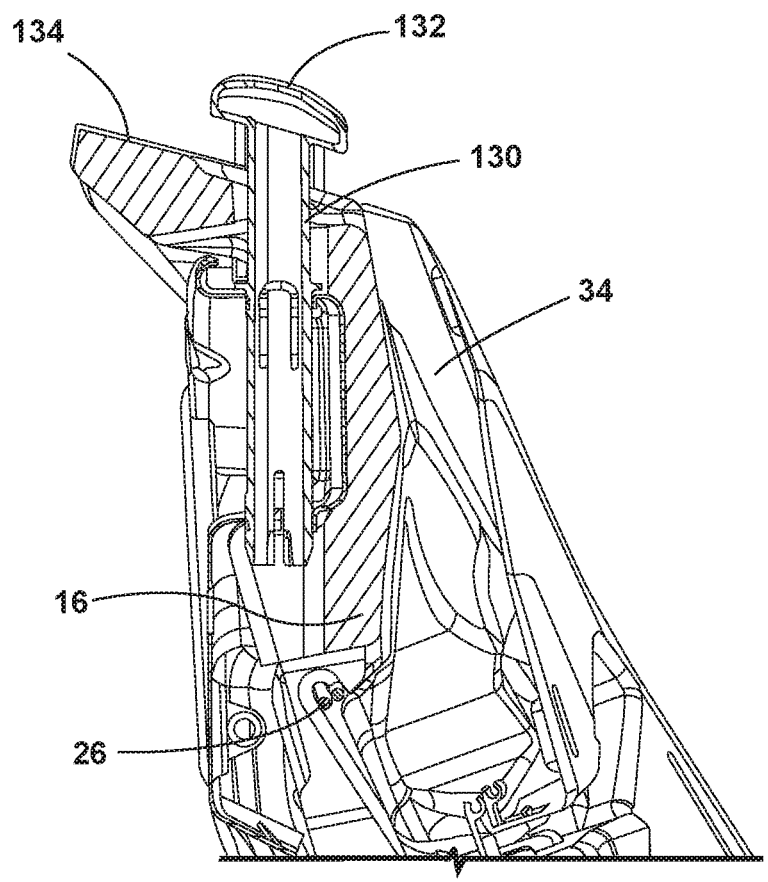
FIG. 10D is a partial side elevational cross-sectional view of a top portion of the seatback taken at a headrest insert support.

With reference now to FIGS. 10-10D, the back module assembly 68 is configured for connection to the seatback frame 82. The completed back module assembly 68, which includes the cushion assembly 34 and the metallic support member 26, is operably coupled with the seatback frame 82 and headrest guide sleeves 130 are inserted into apertures 131 through both the completed back module assembly 68 and the seatback frame 82. The headrest guide sleeves 130 are configured to receive guide posts of a headrest and support the headrest at various positions above the seatback 14 (FIG. 10D). The headrest guide sleeves 130 may include top flanges 132 that may be recessed below a top seatback trim 134, or may extend above the top seatback trim 134, as shown in FIG. 10 after assembly.

Figure 11:
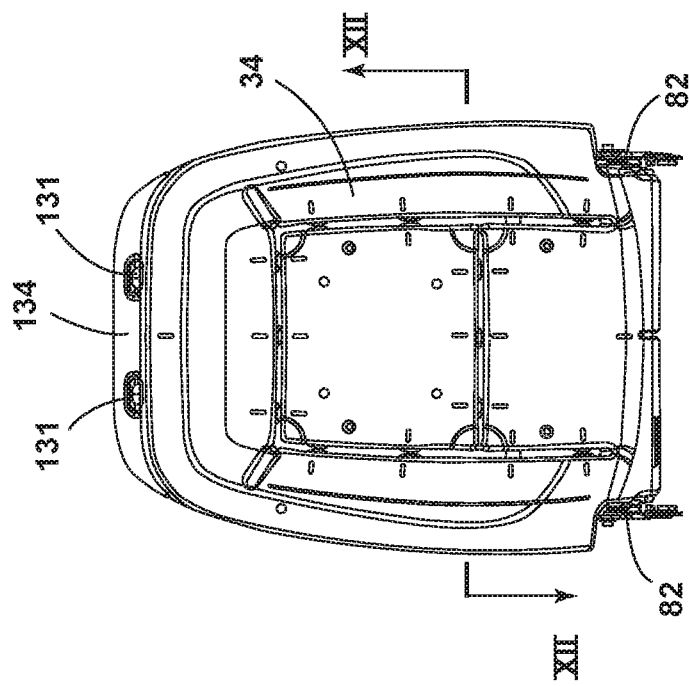
FIG. 11 is a front elevational view of a seatback of the present disclosure.

As shown in FIGS. 11 and 12, an undercut is designed into the geometry of the seatback carrier 16, which snaps behind flanges 140 on the side members of the seatback frame 82, thereby securing the seatback carrier 16 to the seatback frame 82. The connection is a friction connection where the seatback carrier 16 could be removed from the seatback frame 82 without the aid of fasteners.

Figure 13B:
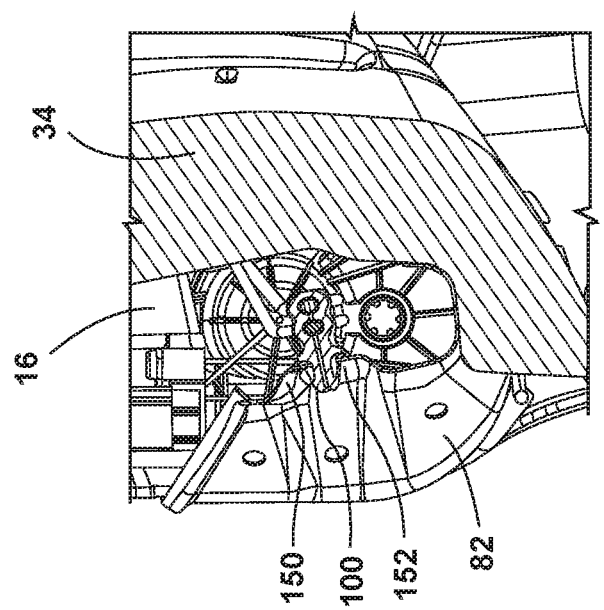
FIG. 13B is a side elevational cross-sectional view of a seatback frame and seatback carrier coupling taken at line XIIIB-XIIIB of FIG. 13A.
Figure 13A:
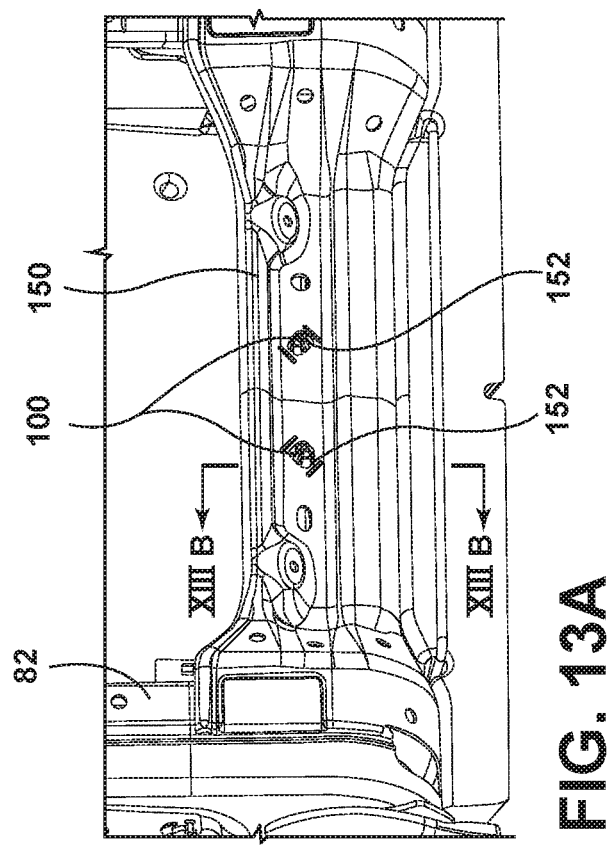
FIG. 13A is a rear perspective view of a bottom cross member of a seatback frame.

With reference now to FIGS. 13A and 13B, a lower wall 150 of the seatback frame 82 defines two apertures 152 configured to receive the modified lower lumbar clips 100. The modified lower lumbar clips 100 are configured for engagement with the lower cross-member 102 of the seatback frame 82, thereby securing the metallic support member 26 with the seatback frame 82. A forward portion of the modified lower lumbar clips 100 wrap around the lower trim wire 70 and a lowest wire of the lumbar basket 80. A rear portion of the modified lower lumbar clips 100 are snap-fittingly engaged with the lower cross-member 102 of the seatback frame 82.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating assembly comprising:
   a seat;
   a seatback pivotally coupled with the seat, the seatback including a seatback carrier formed from expanded polypropylene, the seatback carrier including first and second side walls and an upper wall that together define a lower opening;
   a metallic support member molded within the seatback carrier, the metallic support member including:
      an upper portion extending below the upper wall between the first and second side walls; and
      a lower portion extending across the lower opening; and
   a cushion assembly disposed on the seatback carrier.

2. The seating assembly of claim 1, further comprising:
   a trim wire operably coupled with the lower portion of the metallic support member.

3. The seating assembly of claim 2, further comprising:
   a trim stock operably coupled with the trim wire.

4. The seating assembly of claim 3, wherein the trim stock includes a retainer configured to engage the trim wire.

5. The seating assembly of claim 1, wherein the metallic support member is an elongate looped wire.

6. The seating assembly of claim 1, further comprising:
   a lumbar basket operably coupled with the seatback carrier.

7. The seating assembly of claim 6, wherein the lumbar basket is engaged with the metallic support member.

8. The seating assembly of claim 1, further comprising:
   mechanical fasteners configured to snap-fittingly engage the cushion assembly with a frame of the seating assembly.

9. A seating assembly comprising:
   a seatback including a seatback carrier including first and second side walls and an upper wall that together define a lower opening;
   a support member molded within the seatback carrier, the support member including an upper portion extending below the upper wall and a lower portion extending across the lower opening; and
   a cushion assembly disposed on the seatback carrier.

10. The seating assembly of claim 9, further comprising:
    a lumbar basket operably coupled with the seatback carrier.

11. The seating assembly of claim 10, wherein the lumbar basket is engaged with the support member.

12. The seating assembly of claim 9, further comprising:
    mechanical fasteners configured to snap-fittingly engage the cushion assembly with a frame of said seating assembly.

13. The seating assembly of claim 9, further comprising:
    a trim wire operably coupled with the lower portion of the support member.

14. A seating assembly comprising:
    a seatback including a seatback carrier formed from a polymeric material, the seatback carrier including first and second side walls and an upper wall that together define an opening;
    an elongate support member molded within the seatback carrier, the elongate support member including an upper portion extending below the upper wall and a lower portion extending across the opening; and
    a cushion assembly disposed on the seatback carrier.

15. The seating assembly of claim 14, wherein the elongate support member is an elongate looped wire integrally molded into the first and second side walls of the seatback carrier.

16. The seating assembly of claim 15, wherein the elongate support member includes retention features that protract from each of the first and second side walls of the seatback carrier.

17. The seating assembly of claim 14, further comprising:
    a trim wire operably coupled with the lower portion of the elongate support member.

18. The seating assembly of claim 17, wherein the cushion assembly includes a J-hook that protrudes from a lower portion thereof and engages the trim wire.

19. The seating assembly of claim 14, further comprising:
    a lumbar basket operably coupled with the seatback carrier.

20. The seating assembly of claim 14, further comprising:
    mechanical fasteners configured to snap-fittingly engage the cushion assembly with a frame of said seating assembly.

* * * * *